United States Patent [19]

Sorensen et al.

[11] Patent Number: 5,044,859
[45] Date of Patent: Sep. 3, 1991

[54] CONTROL SYSTEM FOR A STORAGE AND RETRIEVAL MACHINE

[75] Inventors: B. Chuck Sorensen, Salt Lake City, Utah; Craig A. Devroy, Wauwatosa, Wis.

[73] Assignee: Harnischfeger Engineers, Inc., Brookfield, Wis.

[21] Appl. No.: 423,910

[22] Filed: Oct. 19, 1989

[51] Int. Cl.⁵ .................. H02P 5/06; G06F 15/40; B65G 1/06
[52] U.S. Cl. .................. 414/273; 364/478; 364/424.07; 414/282
[58] Field of Search .............. 414/273, 274, 275, 277, 414/280, 281, 282; 364/424.07, 478

[56] References Cited

U.S. PATENT DOCUMENTS

| | | | |
|---|---|---|---|
| 3,441,713 | 4/1969 | Pinto et al. | 364/478 X |
| 3,638,575 | 2/1972 | Griner | 414/273 X |
| 3,646,890 | 3/1972 | Snyder | 364/478 X |
| 3,734,310 | 5/1973 | Miller | 414/273 |
| 3,782,565 | 1/1974 | Doran et al. | 414/281 X |
| 3,786,929 | 1/1974 | Hathcock, Jr. | 414/273 |
| 3,883,008 | 5/1975 | Castaldi | 414/280 X |
| 4,039,785 | 8/1977 | Ziemann | 364/478 |
| 4,232,370 | 11/1980 | Tapley | 364/478 |
| 4,411,577 | 10/1983 | Shearer, Jr. | 414/273 X |
| 4,415,975 | 11/1983 | Burt | 364/478 X |
| 4,669,047 | 5/1987 | Chucta | 364/478 X |
| 4,773,807 | 9/1988 | Kroll et al. | 414/282 |
| 4,861,223 | 8/1989 | Olson | 414/280 X |
| 4,967,130 | 10/1990 | Sarensen et al. | 414/281 X |

FOREIGN PATENT DOCUMENTS

| | | | |
|---|---|---|---|
| 1445939 | 6/1966 | France | 414/281 |
| 55-156108 | 12/1980 | Japan | 414/273 |
| 57-81005 | 5/1982 | Japan | 414/273 |
| 58-162405 | 9/1983 | Japan | 414/282 |
| 60-183405 | 9/1985 | Japan | 364/478 |
| 61-145001 | 7/1986 | Japan | 414/277 |
| 62-121104 | 6/1987 | Japan | 414/273 |

OTHER PUBLICATIONS

Recent Trends in Crane Automation . . . , by Satake & Works, Found in Mitubishi Electric Engineer, Sep. 1976, pp. 6-12.

Primary Examiner—David A. Bucci
Assistant Examiner—Robert S. Katz
Attorney, Agent, or Firm—Richard C. Ruppin

[57] ABSTRACT

A control system for a storage and retrieval machine is disclosed in which a supervisory control is responsive to operating commands from a remote source to provide operating instructions for the control of the base, carriage and shuttle of the storage and retrieval machine. Separate controls for the base, the carriage and the shuttle respectively contain base, carriage and shuttle operating parameters. The base, carriage and shuttle controls are responsive to operating instructions from the supervisory control to respectively control movement of the base, carriage and shuttle in accord with the associated base, carriage and shuttle operating instructions and parameters. A base drive, carriage drive and a shuttle drive are also provided and each include a drive control which produces drive control instructions. The base, carriage and shuttle drives are respectively responsive to control instructions from the base, carriage and shuttle controls and their associated drive control instructions to move the associated base, carriage and shuttle.

2 Claims, 4 Drawing Sheets

CONTROL SYSTEM FOR A STORAGE AND RETRIEVAL MACHINE

FIELD OF THE INVENTION

This invention relates generally to the control of a storage and retrieval machine and in particular to a layered, redundant control system for a storage and retrieval machine.

BACKGROUND OF THE INVENTION

Control systems for storage and retrieval machines are subject to environmental problems such as electrical noise from other nearby electrically operated equipment, mechanical vibration of the storage and retrieval machine as it operates, and stress on wires due to substantially continuous operating movement with frequent starts and stops of the storage and retrieval machine. The continuous operating movement of the storage and retrieval machine also makes troubleshooting of the machine's control system while running particularly difficult. Storage and retrieval machine control systems also typically have extensive wiring requirements, relays with movable parts which wear over time, and control programs which are difficult to change.

The drives for most storage and retrieval machines are of A.C. wound rotor motor types using eddy current brakes and reactors or D.C. motors employing resistors and contactors to control armature voltage and thereby motor speed. These types of drives have low performance and efficiency, and poor control feedback systems.

As a result of the difficult environment in which control systems for storage and retrieval machines operate, design deficiencies of the control systems, and storage and retrieval machine drives which are difficult to control, storage and retrieval machines are relatively inaccurate in their operation, slow, and have an undesirably high level of safety problems.

SUMMARY OF THE INVENTION

It is an object of this invention to provide a control system for a storage and retrieval machine which is accurate and minimizes safety problems. It is a further object of the invention to provide a layered, redundant control system for a storage and retrieval machine in which the control system has separate parts performing different control functions.

The invention is carried out by providing a storage and retrieval machine having a movable base, a mast mounted on the base, a carriage movable vertically on the mast, and a shuttle mounted on the carriage and extendible into and retractable from adjacent storage spaces, with a control system having a supervisory control means responsive to operating commands from a remote source to provide operating instructions for control of the base, the carriage and the shuttle. The control system includes separate base, carriage and shuttle control means respectively containing base, carriage and shuttle parameters. Each of the base, carriage and shuttle control means is responsive to its associated parameters and to the operating instructions to produce control instructions for controlling movement of the respective base, carriage and shuttle. Base drive means, carriage drive means and shuttle drive means are also provided and each include a drive control means which produces drive control instructions. The base, carriage and shuttle drive means are respectively responsive to control instructions from the base, carriage and shuttle control means and their associated drive control instructions to move the associated base, carriage, and shuttle.

The drive control means of each base, carriage and shuttle drive means includes encoder means which may function as a speed control means and also as a position indicator. Movement indicating means may also be provided for the base and carriage and the encoder means and movement indicating means may be used together to provide accurate and redundant position control. The control system may also include an end-of-path sensor for the base. The movement indicating means of the base drive control and the end-of-path sensor then together provide a separate, redundant end-of-path stopping control for the base.

BRIEF DESCRIPTION OF THE DRAWINGS

Further objects and advantages of the invention will appear when taken in conjunction with the accompanying drawings, in which.

DETAILED DESCRIPTION OF THE PREFERRED EMBODIMENT

Figure 1:
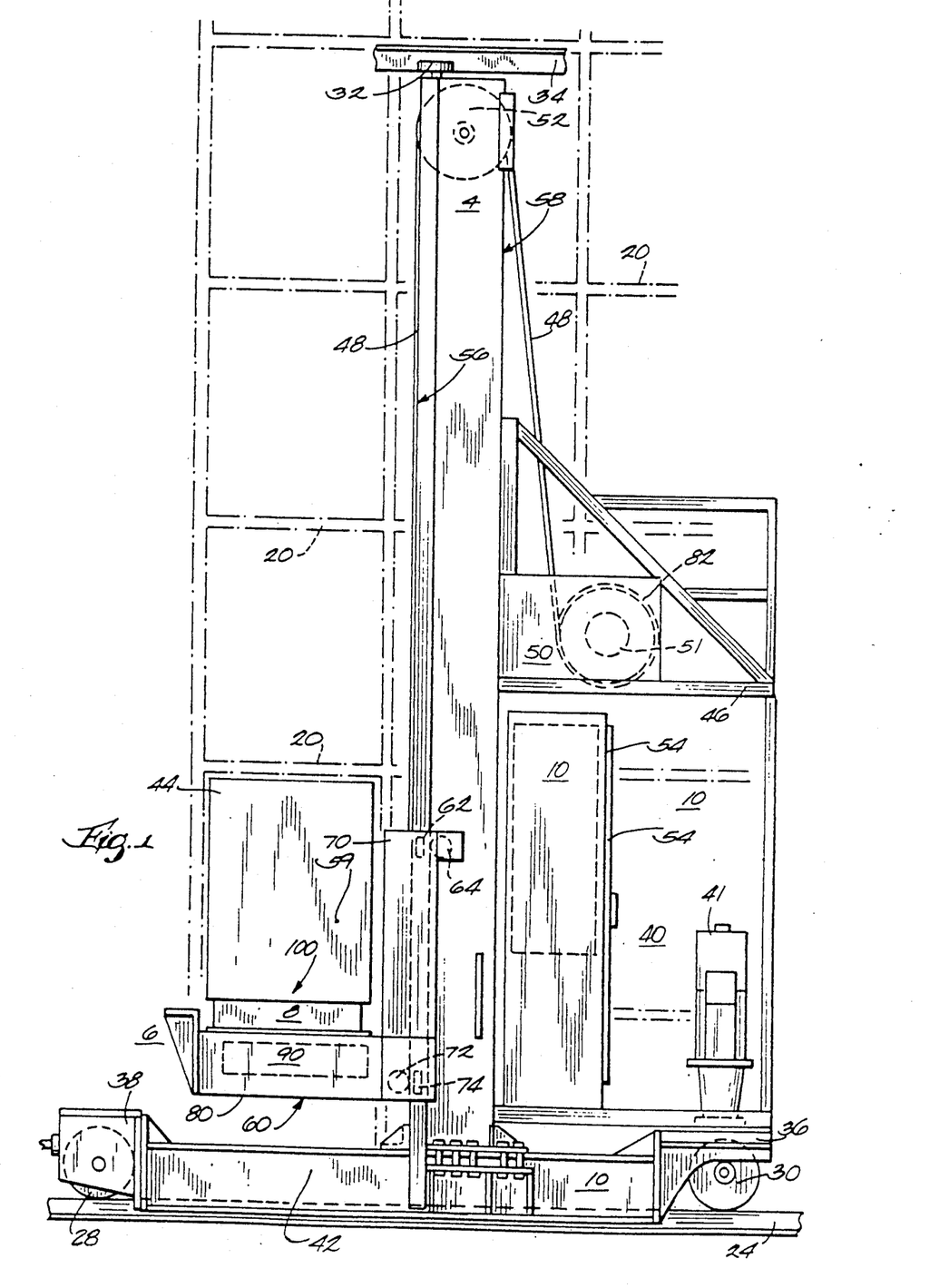
FIG. 1 is a side elevation view of a storage and retrieval machine utilizing the present invention.
Figure 2:
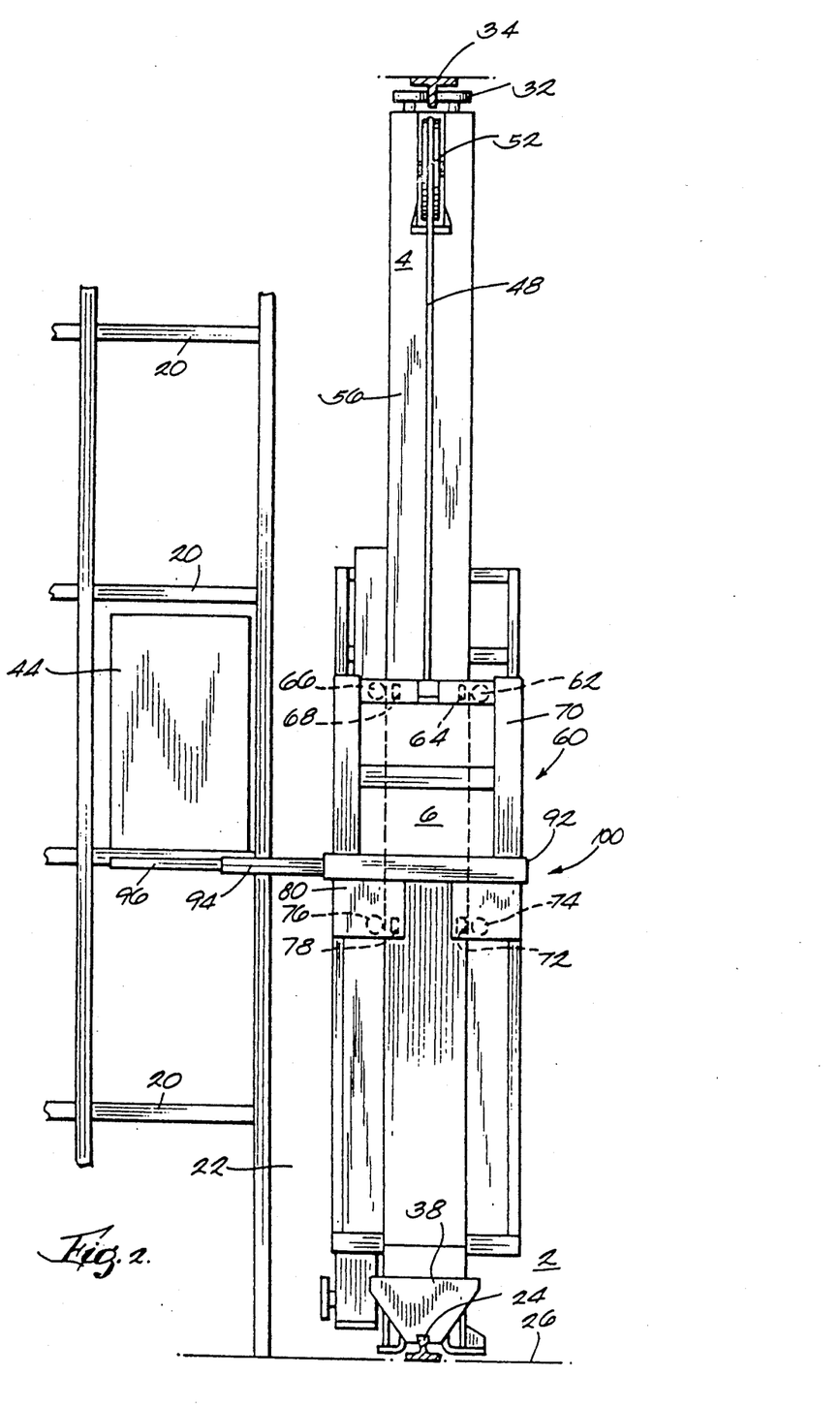
FIG. 2 is a front elevation view of the storage and retrieval machine shown in FIG. 1.
Figure 3:
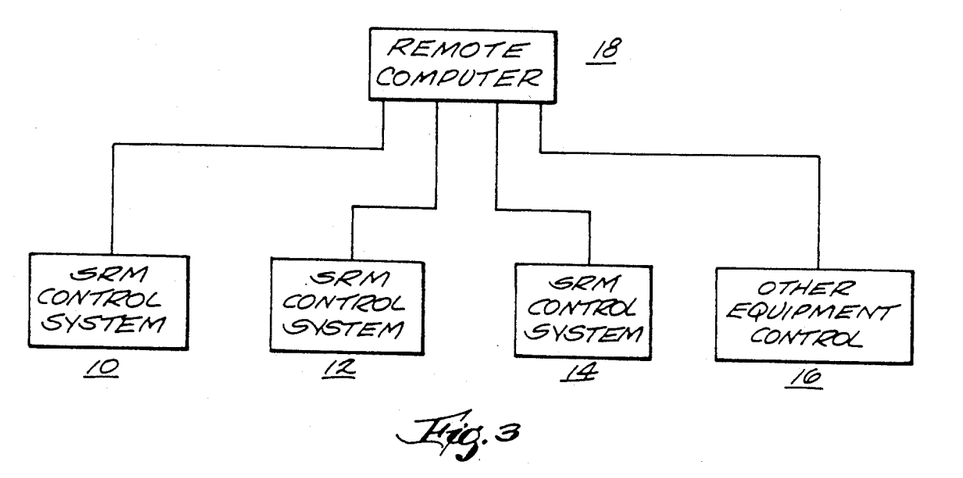
FIG. 3 is a block diagram illustrating the control for the entire system in which the instant invention is incorporated.

Referring generally to FIGS. 1-3 of the drawings, a storage and retrieval machine, which is also referred to herein as an SRM, is shown as having a base 2, a mast 4 mounted on and extending upwardly from the base 2, a carriage 6 movable on a path along the length of the mast 4 to selected vertical positions, a shuttle 8 mounted on the carriage 6, and a control system 10. A front wheel 28 and a rear wheel 30 are mounted on the base 2 and roll along a rail 24 supported on a foundation 26 and running through an aisle path 22 in a storage area such as a warehouse having stacked storage racks 20. Upper guide wheels 32 on the mast 4 engage a guide rail 34 to guide the SRM along the rail 24 and maintain the machine in an upright position. A base motor drive 40 mounted on the base 2 includes a motor 41 and drives the rear wheel 30 so that the base 2 and thereby the SRM travel along the rail 24 to selected locations in the aisle path 22 adjacent to the stacked storage racks 20. At each aisle location of the SRM the carriage 6 is driven in vertical directions to a selected one of the storage racks 20 where the shuttle 8 is driven generally horizontally and in directions transverse to the aisle path 22 into a storage rack to deliver or retrieve a load object such as box 44 carried on the shuttle as shown in FIGS. 1 and 2. The carriage 6 is driven by a carriage motor drive 50 including a motor 51 acting through a rope drum assembly 82, both mounted on a frame 46 affixed to the base 2 and the mast 4, and driving a rope 48 connected to the carriage 6 and sheave 52. A cabinet 54 is also mounted on the base 2 for enclosing a portion of the components of the control system 10. Suitable means (not shown) are provided for supplying electrical power for the various motor drives and control means of the SRM described hereinafter.

The base 2 comprises an elongated beam 42 disposed parallel to the rail 24 and end trucks 36 and 38 affixed to opposite ends of the beam 42. The wheels 28 and 30 are respectively mounted on the trucks 36 and 38. The mast 4 comprises an elongated tube 56 and an additional elongated member 58 affixed along its length to the tube 56.

The carriage 6 includes a frame 60 upon which the shuttle 8 is mounted and to which is connected the rope 48 for moving the carriage 6 vertically along the mast 4 in response to the operation of the motor drive 50 and rope drum assembly 82. The carriage 6 is movably supported and guided on the mast 4 by means of lower support rollers 62, 64, and 66, 68 rotatably mounted on an upper section 70 of the frame 60, and by means of lower support rollers 72, 74, and 76, 78 rotatably mounted on a lower section 80 of the frame 60.

The shuttle 8 comprises a shuttle motor drive 90 mounted on the lower section 80 of the carriage frame 60, a lower base plate 92 also mounted on the lower frame section 80, an intermediate plate 94, a top plate 96, and a shuttle telescoping drive 100. Operation of the shuttle telescoping drive 100 by the shuttle motor drive 90 causes the plates 94 and 96 to extend in a telescoping fashion to the position shown in FIG. 2 and retract to a centered position on the lower frame section 80 relative to the view of FIG. 2. The shuttle 8 thus operates in conjunction with the base 2 and carriage 6 to deposit in or retract from a storage rack 20, and load object 44.

With reference to FIG. 3, a control system for a typical warehouse storage facility is illustrated in which a remote stationary computer 18 provides operating commands to a plurality of SRM control systems 10, 12 and 14, shown in FIG. 3, and to a control 16 for other warehouse related equipment. Each of the control systems 10, 12, and 14 controls a separate storage and retrieval machine or SRM.

The control system 10 is utilized for control of the SRM described herein and incorporates the instant invention. The control system 10 is illustrated in greater detail in FIG. 4 and includes a supervisory control means 110 which receives operating command information on lines 88 from the remote computer 18, a base control means 120 for controlling the movement of the base 2 of the SRM along an axis or path of travel in the aisle path 22, a carriage control means 130 for controlling the movement of the carriage 6 along a path of travel or axis of the mast 4, and a shuttle control means 140 for controlling the extending and retracting movement of the shuttle 8 into and out of a storage rack 20. The supervisory control means 110 has a connection to the base control means 120, carriage control means 130 and shuttle modem means 150 respectively represented by lines 112, 114 and 116. The shuttle modem means 150 is connected to the shuttle control means 140 by means of a representative line 118. The base 2 is further controlled and operated by a base drive control means 160 connected to the base control means 120 by a representative line 122 and by a base motor drive 40 connected to the base drive control means 160 by a representative line 124. The carriage 6 is further controlled and operated along its axis by a carriage drive control means 170 having a representative connection 132 to the carriage control means 130 and by a carriage motor drive 50 having a representative connection 134 to the carriage drive control means 170. The shuttle 8 is further operated and controlled by a shuttle motor drive 90 having a representative connection 126 to the shuttle control means 140.

Figure 4:
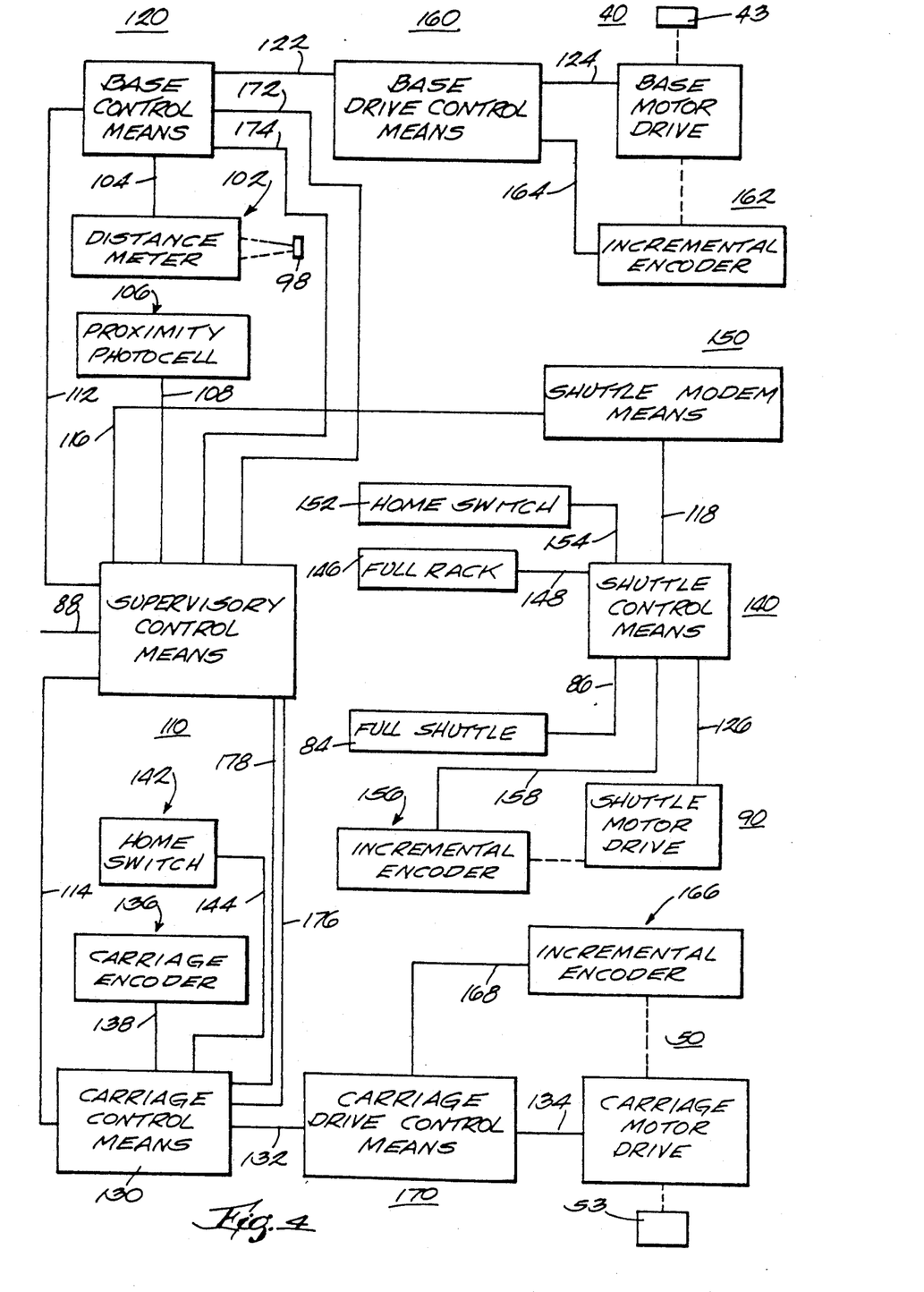
FIG. 4 is a schematic circuit diagram illustrating the control system according to the instant invention.

The base control means 120 includes a distance meter 102 connected by a representative line 104 to the base control means 120, and a proximity photocell 106 connected to the supervisory control means 110 by a representative line 108. The carriage control means 130 includes a carriage encoder 136 connected to the control means 130 by a representative line 138 and a home switch 142 connected to the supervisory control means 110 by a representative line 144. The shuttle control means 140 includes a home switch 152 connected to the supervisory control means 110 through the shuttle control means 140 by representative lines 154, 118 and 116, a full shuttle indicator 84 and a full rack photocell indicator 146 respectively connected by lines 148 and 86 to the shuttle control means 140 and both connected by lines 118 and 116 through the shuttle control means 140 and modem means 150 to the supervisory control means 110. An incremental encoder 162 is mechanically connected to the base motor drive 40 and has an electrical representative connection 164 to the base drive control means 160 for sensing and indicating motor drive rotational velocity and angular position. Similarly, an incremental encoder 166 is mechanically connected to the carriage motor drive 150 and has an electrical representative connection 168 to the carriage drive control means 170 for sensing and indicating carriage motor drive rotational velocity and angular position. The shuttle control includes an incremental encoder 156 mechanically connected to the shuttle motor drive and having a representative electrical connection 158 to shuttle control means 140 for sensing and indicating shuttle motor drive rotational velocity and angular position.

The base control means 120 also includes lines 172 and 174 connected between the base control means 120 and the supervisory control means 110 and which respectively transmit indications to the supervisory control means that the internal circuit of the base control means 120 is functioning correctly and that the base control means 120 is busy with another control instruction so that it cannot carry out a current control instruction from the supervisory control means. The carriage control includes lines 176 and 178 between the carriage control means 130 and the supervisory control means 110 respectively provide indications to the supervisory control means that the internal circuit of the carriage control means is in a correct operating condition and that the carriage control means is busy with another control operation.

The supervisory control means 110 may, for example, comprise a programmable logic controller which is programmed to produce specific operating instructions to the base control means 120, carriage control means 130 and shuttle control means 140 in response to an operating command transmitted on the line 88 from the remote computer 18 to the supervisory control means 110. The operating information from the remote computer 18 is normally a command to the SRM to pick up or deposit a load object 44 or to move to a specified location. The information from the remote computer 18 is converted to RS232C format form and is then converted to a memory block of ASCII characters in binary code form at an input module of the supervisory control means 110. The sequence of commands from the computer 18 and the sequence of instructions from the supervisory control means 110 to the base control means 120, carriage control means 130 and shuttle control means 140 includes information for movement or operation in the direction of all three axis but is always in the order of base, carriage and shuttle. The supervisory control means 110 also has various discrete inputs for receiving operating condition indications relating to the base 2, carriage 6 and shuttle 8 and their associated controls. With respect to the base 2, these include an input on line 108 from the proximity photocell 106 indicating whether or not the rail 24 and the aisle path 22 are clear for the travel of the base 2 and that there is adequate distance between the base and the end of the aisle, an input on line 172 indicating whether the internal circuit of the base control means 120 is in a correct operating condition, and an input on line 174 indicating whether the base control means 2 is in a busy condition and cannot accept an instruction for a further operation. The supervisory control means 110 inputs from the carriage control include an input on line 144 from the home switch 142 indicating whether the carriage 6 is at its reference home position, an input on line 176 indicating whether the internal circuit of the carriage control means 130 is in a correct operation condition, and an input on line 178 indicating whether the carriage control means 130 is in a busy condition and cannot accept an instruction for a new operation. The supervisory control means also has an input from the shuttle control means 140 including an input on line 154 from home switch 152 indicating whether the shuttle 8 is at a center, home position on the carriage 6, an input on lines 148, 118 and 116 indicating the full or empty condition of the racks into which a load object is to be deposited, and an input on lines 86, 118 and 116 indicating the full or empty condition of the shuttle.

As previously stated, the supervisory control means 110 produces control instructions in response to operating commands received from the remote computer 18 on the line 88. The control instructions are also in accord with the condition indication signals on the discrete input lines 108, 172, 174 relating to the base control, the discrete input lines 144, 176, 178 relating to the carriage control, and the discrete input lines 86, 148, 154 relating to the shuttle control. Moreover, the control instructions from the supervisory control means 110 are contingent on the signals in that if the condition signals are not positive, i.e., do not indicate that SRM operation may proceed, the control instructions will stop the SRM operation. For example, if the proximity photocell 106 provides an indication signal on line 108 that there is inadequate distance between the base and the end of the aisle in which the base is located, the supervisory control means will issue a stop control instruction. As the supervisory instructions are transmitted to the base control means 120, carriage control means 130 and shuttle control means 140 through the shuttle modem means 150, each of the control means will also respond to the supervisory control means 110 and further control instructions from the control means 110 will be in accord with and dependent upon such response indications. Thus, the supervisory control means 110 will proceed through a sequence of operating steps, dependent on its internal program, and receive commands, responses, and condition information, process the information received, and transmit instructions as necessary for the combined operation of the base 2, carriage 6 and shuttle 8 in carrying out the commands received from the remote computer 18. The instructions to and the responses from the base control means 120 and the carriage control means 130, and to the shuttle control means 140 through the shuttle modem means 150, are in RS232C format. The shuttle modem means 150 converts the RS232C format to a modulated frequency signal. The base control means 120 and the carriage control means 130 are a proportional integral derivative (PID) type of controller. The base control means 120, carriage control means 130 and shuttle control means 140 each contain a program and the respective parameters of the associated base, carriage and shuttle which the control means 120, 130 and 140 control and which enable movement operation of the base 2, carriage 6 and shuttle 8 at optimum acceleration, deceleration and velocity values. These parameters include the reference position of the carriage and shuttle, the velocity, acceleration rate and deceleration rate of the base and carriage, and the deceleration rate of the shuttle. The control of the different moving parts of the SRM is thus distributed between the supervisory control means 110, the control means 120, 130 and 140, and the base drive control means 160 and carriage drive control means 170. The control also has a layered organization in which the supervisory control means 110 comprises the top layer, the base, carriage and shuttle control means 120, 130 and 140 comprise a middle layer, the base drive control means 160 and the carriage drive control means 170 comprise a second middle layer, and the base motor drive 40, carriage motor drive 50, and shuttle motor drive 90 including their associated incremental encoders comprise a bottom layer. This distributed and layered organization enables very rapid and accurate control of the SRM.

The distance meter 102 of the base control means 120 transmits an infrared light beam along the axis of travel of the base 2 toward the reflector 98 so that a reflected beam is returned to the distance motor 102 to provide a movement indication and distance measurement which locates the position of the base 2 along its axis, that is, aisle path 22. Upon receipt of a control instruction on line 112 by the base control means 120 from the supervisory control means 110 requiring a movement of the base 2 along its axis, the control means 120 will compare the position to which the base is to travel with the base's current position as indicated by the distance meter 102. The means 120 also will concurrently determine on the basis of the base parameters and the distance to be traveled, the acceleration rate and velocity to which the base can accelerate to travel to the new position, and the deceleration rate as the base approaches the new position. Upon calculation of these values, the base control means 120 will transmit appropriate instruction signals to the base drive control means 160 for the control of the frequency of the variable frequency power output from the means 160 to the base motor drive 40 to drive the base 2 at an acceleration, velocity and deceleration rate to move the base 2 to the new position.

The distance meter 102, as part of the locating of the position of the base along its aisle path, also provides an end-of-path indication for the base. In response to the end-of-path indication on line 104 by the distance meter, the base control means 120 wills top the travel of the base. Thus, in view of the stopping of the base as a result of an indication signal from the proximity photocell 106 to the supervisory control means 110, as previously described, a redundant end-of-path stopping control over the base is provided.

When the base 2 and thereby the SRM is at an instructed position along the aisle path 22, the base drive control means 160 and the base motor drive 40 remain energized to hold the base 2 at the position. If the base 2 drifts or otherwise moves from the instructed position, after movement beyond a tolerance distance of the distance meter 102, the distance meter will indicate the change in position and this will result in a correcting signal from the base control means 120 to result in the base motor drive 40 returning the base 2 to the instructed position. However, as noted, this correction movement will not take place until the tolerance distance of the distance meter 102 is exceeded. The incremental encoder 162 provides a position indication of the rotor 43 of the motor 41 of the base motor drive 40 at a very small change in its position, corresponding to a much smaller movement in the position of the base 2 than the movement of the base 2 corresponding to the tolerance distance of the distance meter 102. A signal representative of this change in the angular position of the rotor 43 is transmitted on line 164 to the base drive control means 160 so that it controls the base motor drive 40 to correct the rotor position before the base 2 moves sufficiently far for the tolerance distance of the distance meter 102 to be exceeded. This results in very close position control of the base 2 and also provides redundant control in the event of failure or change in sensitivity of the distance meter.

During an initialization operation of the SRM, the carriage control means 130 is instructed by the supervisory control means 110 to move the carriage 6 to a home position. Movement of the carriage 6 to the home position will be indicated by the home switch 142 in a response to the control means 130. The home position of the carriage 6 is a reference position at which the count of the carriage encoder 136 provides a reference indication representing the reference position for all subsequent movements of the carriage and the carriage encoder. Upon receipt of a control instruction on line 114 to the carriage control means 130 from the supervisory control means 110 requiring a pick-up or deposit movement of the carriage 6 along its axis, the control means 130 will compare the instructed position to which the carriage is to travel with its current position as indicated by the carriage encoder 136. The control means 130 also determines, upon the basis of the carriage parameters, the acceleration rate and velocity to which the carriage can accelerate to travel to the new position, and the deceleration rate upon approaching the new position. Upon calculation of these values, the carriage control means 130 will transmit appropriate instruction signals to the carriage drive control means 170 for the control of the frequency of the variable frequency output from the drive control means 170 to the carriage motor drive 50 to drive the carriage 6 at an acceleration, velocity and deceleration rate to move the carriage 6 to the new position.

When the carriage 6 is at an instructed position on its axis along the mast 4, the carriage drive control means 170 and the carriage motor drive 50 remain energized to hold the carriage 6 at the position. If the carriage 6 slides downward due to, for example, the lifting of the load object 44, and thereby moves from the instructed position, after movement beyond a tolerance distance of the carriage encoder 136 the encoder 136 will indicate the change in position. The position change indication will result in a correcting signal from the carriage control means 130 to result in the carriage motor drive 50 returning the carriage 6 to the instructed position. However, the incremental encoder 166 provides a position indication of the rotor 53 of the motor 51 at a very small change in the rotor position corresponding to a much smaller movement in the position of the carriage 6 then the movement of the carriage 6 corresponding to the tolerance distance of the carriage encoder 36. A signal representative of this change in the angular position of the rotor 53 is transmitted on line 168 to the carriage drive control means 170 so that it controls the carriage motor drive 50 to correct the rotor position before the carriage 6 moves a distance sufficient for the tolerance distance of the carriage encoder 136 to be exceeded. The carriage 6 position is also thus very closely controlled and provided with redundant back-up control.

Also during initialization of the SRM, the shuttle control means 140 is instructed by the supervisory control means 110 to move the shuttle 8 to a home position. Movement of the shuttle 8 to the home position will be indicated by the home switch 152 in a response to the control means 140. The home position of the shuttle 8 is a reference position at which the count of the shuttle encoder 156 provides a reference indication representing the reference position for all subsequent movements of the shuttle and the shuttle encoder.

During subsequent operation after initialization of the SRM, a control instruction on line 116 to the shuttle control means 140 from the supervisory control means 110 requiring a pick-up or deposit movement of the shuttle 8 along its axis will include the acceleration and velocity at which the shuttle is to move, and the position to which the shuttle is to move. The shuttle control means itself contains the shuttle deceleration rate which is to be applied. The shuttle control means will compare the instructed new position to which the shuttle is to travel with the shuttle current position as indicated by the shuttle encoder 156. Following this determination the shuttle control mean 140 will transmit appropriate instruction signals to the shuttle motor drive 90 for the control of the frequency of the variable output from the motor drive 90 to drive the shuttle 8 at an acceleration, velocity and deceleration rate to move the shuttle 8 to the new position.

In providing instructions to the base control means 120, carriage control means 130, and shuttle control means 140 for the operation of the SRM, the supervisory control means 110 first receives a command from the remote computer 18 to pick up a load object, move to another position, or deposit a load object. The command will include the position to which the move is to be made or at which the pick up or deposit is to be made. The control means 110 may optionally include instructions for the velocity, acceleration and deceleration at which the base 2 or carriage 6 may travel.

The supervisory control means 110 includes a program of instructions and condition requirements for directing the base 2, carriage 6 and shuttle 8 which are respectively provided to the control means 120, 130 and 140 and monitored during a control sequence operation of the supervisory control means 110. However, the supervisory control means 110 does not control the operating parameters of the control means 120, 130 and 140 and the motor drives 40, 50 and 90 such as the velocity and the varying rates of acceleration and deceleration that the base 2, carriage 6 and shuttle 8 are to operate at, and whether these operating parameters are followed. Control of the operating parameters is largely carried out by the control means 120, 130, and 140 with assistance from the motor drives 40, 50 and 90. This distribution of the overall control of the SRM enables the use of a single supervisory control means 110 to provide a very precise and relatively high speed control over the entire operation of the SRM. Use of a separate control over the operating parameters of each of the base 2, carriage 6 and shuttle 8 as they move along their respective axis further contributes to accurate and fast operation.

A control sequence for the supervisory means 110 is illustrated in the Appendix set forth hereinafter and illustrates a sequence of status monitoring, condition checks, instructions to, and responses received from, the base control means 120, carriage control means 130 and shuttle control means 140. At sequence 1, upon receipt of a command from the remote computer 18, the supervisory control means 110 checks to determine whether the command is valid, that is, whether it is of the type of command which the control means 110 may receive. At sequence 2, the control means 110 instructs the shuttle to go to home position, if it is already not at that position, and the shuttle control means 140 acknowledges the receipt of the instruction. At sequence 3, a home position response will be received from the home switch 152 of the shuttle on line 154 to the control means 110. At sequence 4, the carriage control means 130 is instructed to operate the carriage 6 to its home position, if it is already not at that position, and an acknowledgement of the instruction is received back. At sequence 5, the control means 110 sends to the base control means 120, acceleration and velocity values, and aisle position or distance that the base is to go to carry out a pick up operation. This instruction is acknowledged by the control means 120. At sequence 6, the control means 110 sends a similar instruction to the carriage control means 130 to move at a specified acceleration and velocity, and go to a vertical rack position or move a specified distance to pick up the load object. The control means 130 acknowledges the receipt of the instruction. If acceleration and velocity values are not given in the instruction, the control means 120 and 130 will provide previously programmed base or carriage acceleration and velocity values. The control means 110 provides acceleration and velocity values for a shuttle non-load condition, which the shuttle will be in when it is operating to pick up a load, at sequence 7 and the shuttle control means 140 acknowledges receipt of the instruction.

At sequence 8, the control means 110 waits for acknowledgement that the previously given base and carriage instructions have been completed and, upon such indication, the control means 110 requests confirming base axis and carriage axis position to ensure that the base 2 and carriage 6 are precisely at their instructed locations. Following verification of the location of the base 2 and carriage 6, which should now be located opposite a rack 16, if the load pick up instruction has been to pick up a load from a far rack, at sequence 9 the control means 110 will check the condition of the near rack to determine if it is full. If not, the sequence continues on to sequence 10 where the control means 110 instructs the control means 140 to direct the extension of the shuttle a distance required for a pick up at the far rack. At sequence 11, the control means 110 receives a response from the control means 140 that the shuttle is fully extended. To confirm that this in fact has been done, the control means 110 requests the current position of the shuttle and receives the position response back. Upon confirmation that the shuttle is fully extended so that it is beneath the load object in a storage rack, the control means 130 is given instructions for a carriage acceleration and velocity for a condition in which the shuttle is extended, an upward movement distance. The movement distance is such that the shuttle will engage and lift the load object. The control means 130 acknowledges receipt of the instruction. At the same time for purposes of efficient use of time, the shuttle control means 140 is given an instruction for shuttle acceleration and velocity in a loaded condition and an instruction acknowledgement is received back. At sequence 13 the carriage control means 130 provides an upward movement completed response to the control means 110, the control means 110 requests a current position confirmation and a current position response is given. The load object is now supported by the extended shuttle adjacent to the rack location and, to retrieve it on to the carriage, the control means 110 provides a shuttle center command to control means 140 and an instruction acknowledge response is received by the control means 110. Upon the return of the shuttle to a centered position, the load object is essentially supported by the carriage 6. At sequence 15, the shuttle centering completed response is received by the control means 110 from the shuttle control means 140. The control means 110 then requests the current position of the shuttle to confirm its centered position and receives the current position indication from the shuttle control means 140.

At sequence 16, the control means 110 requests confirmation that a load object is in fact on board the shuttle from the control means 140. The confirmation of the load on board, with the shuttle centered is the beginning of the deposit instruction for the deposit operation of the SRM. At sequence 17, the control means 110, based on a command previously received from the remote computer 18, provides the deposit instruction to the base control means 120 which consists of an aisle or base axis position to which the base is to travel, and may include the acceleration and velocity at which the base is to travel. An acknowledgement to the deposit instruction is then received back by the control means 110. At sequence 18, the control means 110 provides a similar instruction to the carriage control means 130 directing that the carriage move to a specified rack location and travel at an acceleration and a loaded velocity, and an instruction acknowledgment response is received back. Prior to extending the shuttle and the load object carried by it into a rack, at sequence 19, the rack full sensors are turned on. At sequence 20, the control means 110 provides to the shuttle control means 140 the shuttle acceleration and velocity in a loaded condition and an instruction acknowledgement is received back. At sequence 21, the control means 110 receives acknowledgement from the base control means 120 and carriage control means 130 that the base 2 and carriage 6 have moved to their instructed positions to permit deposit of the load object. Also, at sequence 21, the control means 110 requests confirmation that the base and carriage in fact are at their instructed positions and a current position response is received back. Prior to extending the shuttle with the load object out into a rack, at sequence 22, the full rack sensors are monitored by the control means 110 to determine whether the necessary racks required for deposit of the load object are actually empty. At sequence 23, the control means 110 instructs the control means 140 to extend the shuttle an instructed distance at the previously instructed velocity and acceleration and an instruction acknowledgement is received back. At sequence 24, a shuttle extension completed response is provided to the control 110 which then also requests and receives back a current shuttle position confirmation. The supervisory control means 110 now instructs the carriage control means 130 at sequence 25 to move the carriage 6 downward a short distance at a specified acceleration and velocity to permit depositing of the load object on the rack, and an instruction acknowledgement is received back. At the same time, an instruction is given to the shuttle control means 140 for the retrieval of the shuttle at a specified acceleration and velocity in an unloaded condition. At sequence 26, a carriage lowering completed indication is provided to the control 110 which then requests and receives a carriage position confirmation indication. Following confirmation that the carriage has lowered to a position permitting the deposit of the load object in the rack, the control means 110 at sequence 27 instructs the control means 140 to withdraw and center the shuttle. At sequence 28, a shuttle centered indication is provided to the control means 110 which then requests and receives a centered confirmation indication from the control means 140. The control means 110, at sequence 29, then sends a command completed indication to the remote computer 18.

It will be understood that the foregoing description of the present invention is for purposes of illustration only and that the invention is susceptible to a number of modifications or changes, none of which entail any departure from the spirit and scope of the present invention as defined in the hereto appended claims.

APPENDIX

| Sequence | Supervisory Control Means 110 | Base Control Means 120 Carriage Control Means 130 Shuttle Control Means 140 Condition Indicators |
|---|---|---|
| SEQUENCE 1 | CHECK COMMAND TO SEE IF VALID | |
| SEQUENCE 2 | IF SHUTTLE NEEDS TO BE HOMED SHUTTLE GO HOME → | ← ACKNOWLEDGE |
| SEQUENCE 3 | WAIT FOR SHUTTLE TO GO TO HOME POSITION | |
| SEQUENCE 4 | IF CARRIAGE NEEDS TO BE HOMED CARRIAGE GO HOME → | ← ACKNOWLEDGE |
| SEQUENCE 5 | SEND POSITION TO BASE CONTROL (PICK-UP COMMAND) BASE ACCELERATION, VELOCITY, & DISTANCE → | ← ACKNOWLEDGE |
| SEQUENCE 6 | SEND POSITION TO CARRIAGE CONTROL (PICK-UP COMMAND) CARRIAGE ACCELERATION, VELOCITY WITHOUT LOAD, AND DISTANCE → | ← ACKNOWLEDGE |
| SEQUENCE 7 | LOAD SHUTTLE WITH ACCELERATION & VELOCITY, SHUTTLE ACCELERATION & VELOCITY WITHOUT LOAD → | ← ACKNOWLEDGE |
| SEQUENCE 8 | WAIT FOR BASE & CARRIAGE TO COMPLETE REQUEST CURRENT BASE POSITION → REQUEST CURRENT CARRIAGE POSITION → | ← BASE COMMAND DONE ← CURRENT BASE POSITION RESPONSE ← CARRIAGE COMMAND DONE ← CURRENT CARRIAGE POSITION RESPONSE |
| SEQUENCE 9 | CHECK FOR FULL RACK NEAR (IF PICKING FROM FAR RACK) | |
| SEQUENCE 10 | SEND SHUTTLE OUT SHUTTLE LOAD DISTANCE & GO → | ← ACKNOWLEDGE |
| SEQUENCE 11 | WAIT FOR SHUTTLE TO EXTEND REQUEST CURRENT SHUTTLE POSITION | ← COMMAND DONE RESPONSE ← ACKNOWLEDGE ← CURRENT POSITION RESPONSE |
| SEQUENCE 12 | RAISE CARRIAGE TO REMOVE LEVEL, SHUTTLE LOADED ACCELERATION & VELOCITY CARRIAGE ACCELERATION & VELOCITY WITH SHUTTLE OUT & DISTANCE → SHUTTLE ACCELERATION & VELOCITY WITH LOAD → | ← ACKNOWLEDGE ← ACKNOWLEDGE |
| SEQUENCE 13 | WAIT FOR CARRIAGE TO REACH REMOVE LEVEL REQUEST CURRENT CARRIAGE POSITION → | ← COMMAND DONE RESPONSE ← CURRENT CARRIAGE POSITION RESPONSE |
| SEQUENCE 14 | SEND SHUTTLE TO CENTER POSITION SHUTTLE CENTER COMMAND | ← ACKNOWLEDGE |

APPENDIX-continued

| Sequence | Supervisory Control Means 110 | Base Control Means 120<br>Carriage Control Means 130<br>Shuttle Control Means 140<br>Condition Indicators |
|---|---|---|
| SEQUENCE 15 | WAIT FOR SHUTTLE TO CENTER | ← COMMAND DONE RESPONSE |
| | REQUEST CURRENT SHUTTLE POSITION → | ← ACKNOWLEDGE<br>← CURRENT SHUTTLE POSITION RESPONSE |
| SEQUENCE 16 | CHECK FOR LOAD ON BOARD (START OF DEPOSIT COMMAND) | |
| SEQUENCE 17 | SEND POSITION TO BASE CONTROL BASE ACCELERATION, VELOCITY & DISTANCE → | ← ACKNOWLEDGE |
| SEQUENCE 18 | SEND POSITION TO CARRIAGE CONTROL CARRIAGE ACCELERATION & VELOCITY WITH LOAD & DISTANCE → | ← ACKNOWLEDGE |
| SEQUENCE 19 | TURN ON FULL RACK PHOTOCELLS IF NECESSARY TURN ON SHUTTLE DISCRETE OUTPUTS → | ← ACKNOWLEDGE |
| SEQUENCE 20 | LOAD SHUTTLE WITH ACCELERATION & VELOCITY SHUTTLE ACCELERATION & VELOCITY WITH LOAD → | ← ACKNOWLEDGE |
| SEQUENCE 21 | WAIT FOR BASE & CARRIAGE TO COMPLETE REQUEST CARRIAGE CURRENT POSITION → | ← CARRIAGE COMMAND DONE RESPONSE<br>← CURRENT CARRIAGE POSITION RESPONSE<br>← BASE COMMAND DONE RESPONSE |
| | REQUEST BASE CURRENT POSITION → | ← CURRENT BASE POSITION RESPONSE |
| SEQUENCE 22 | CHECK FOR FULL RACK | |
| SEQUENCE 23 | SEND SHUTTLE OUT SHUTTLE LOAD DISTANCE AND GO → | ← ACKNOWLEDGE |
| SEQUENCE 24 | WAIT FOR SHUTTLE TO EXTEND | ← COMMAND DONE RESPONSE |
| | REQUEST CURRENT SHUTTLE POSITION → | ← ACKNOWLEDGE<br>← CURRENT SHUTTLE POSITION RESPONSE |
| SEQUENCE 25 | SEND CARRIAGE TO RETRIEVE LEVEL, LOAD SHUTTLE ACCELERATION & VELOCITY CARRIAGE ACCELERATION & VELOCITY WITH SHUTTLE OUT & DISTANCE → | ← ACKNOWLEDGE |
| | SHUTTLE ACCELERATION & VELOCITY WITHOUT LOAD → | ← ACKNOWLEDGE |
| SEQUENCE 26 | WAIT FOR CARRIAGE TO REACH RETRIEVE LEVEL REQUEST CARRIAGE CURRENT POSITION → | ← CARRIAGE COMMAND DONE RESPONSE<br>← CURRENT CARRIAGE POSITION RESPONSE |
| SEQUENCE 27 | SEND SHUTTLE TO CENTER SHUTTLE CENTER COMMAND → | ← ACKNOWLEDGE |
| SEQUENCE 28 | WAIT FOR SHUTTLE TO REACH CENTER | ← COMMAND DONE RESPONSE |
| | REQUEST CURRENT SHUTTLE POSITION → | ← ACKNOWLEDGE<br>← CURRENT SHUTTLE POSITION RESPONSE |
| SEQUENCE 29 | SEND COMMAND COMPLETE MESSAGE TO REMOTE COMPUTER | |

What is claimed is:
1. In a storage and retrieval machine controllable in response to commands from a remote source and having a base travelable along a generally horizontal path having an end, a control system comprising:
base drive means for providing horizontal movement to said base;
sensing means for sensing the end of the path along which the base moves and providing an end-of-path indication;
supervisory control means mounted on the storage and retrieval machine and connected to the sensing means and to the remote source, the supervisory control means being responsive to operating commands from the remote source and to the end-of- path indication from the sensing means to provide operating instructions for the base including a stop instruction upon receipt of the end-of-path indication;

indicating means separate from the sensing means for sensing the position of the base means as it moves along the path and providing a position indicating including an end-of-path position indication; and base control means for controlling said base motor drive and for receiving the operating instructions from the supervisory control means including said stop instruction and the position indication from the indicating means including the end-of-path position indication, the base control means being responsive to both the stop instruction and the end-of-path position indication to stop the travel of the base upon receipt of either the stop instruction or the end-of-path indication whereby the safety of the redundant end-of-path base stopping control is provided.

2. The control system according to claim 1 wherein:

the base is movable to a designated base position along the horizontal path; and further comprising a mast mounted on the base;

carriage means movable in vertical directions along a path on the mast to and from designated carriage positions adjacent storage spaces;

the base drive means including a base motor for moving the base along its path and holding the base at one of the designated base positions on its path;

carriage drive means including a motor for moving the carriage means along its path and holding the carriage means at one of the designated carriage positions on its path;

the base indicating means sensing the movement of the base along its path and producing a first base movement signal upon the movement of the base at least a base tolerance distance from said one of the designated base positions at which the base is held;

carriage indicating means for sensing the movement of the carriage means along tis path and producing a first carriage movement signal upon the movement of the carriage means at least a carriage tolerance distance from said one of the designated carriage positions at which the carriage means is held;

the base control means is connected to the base drive means and is responsive to the first base movement signal of the base indicating means to control the base drive means to return the base to said one of the designated base positions;

carriage control means connected to the carriage drive means and responsive to the first carriage movement signal of the carriage indicating means to control the carriage drive means to return the carriage means to said one of the designated carriage positions;

the base drive means includes base encoder means for indicating movement of the base motor corresponding to movement of the base from said one of the designated base positions less than said base tolerance distance, the base drive means being responsive to the indication of the base encoder means to return the base to said one of the designated base positions whereby position control of the base is maintained within the base tolerance distance of the base indicating means; and the carriage drive means includes carriage encoder means for indicating movement of the carriage motor corresponding to movement of the carriage means from said one of the designated carriage positions less than said carriage tolerance distance, the carriage drive means being responsive to the indication of the carriage encoder means to return the carriage means to said one of the designated carriage positions whereby position control of the carriage means is maintained within the carriage tolerance distance of the carriage indicating means.

* * * * *